United States Patent
Benoit (10) Patent No.: US 6,820,814 B1
(45) Date of Patent: Nov. 23, 2004

(54) COUNTERMEASURE METHOD IN AN ELECTRIC COMPONENT USING A SECRET KEY CRYPTOGRAPHIC ALGORITHM

(75) Inventor: Olivier Benoit, Aubagne (FR)

(73) Assignee: Gegemplus, Gemenos (FR)

( * ) Notice: Subject to any disclaimer, the term of this patent is extended or adjusted under 35 U.S.C. 154(b) by 0 days.

(21) Appl. No.: 09/936,208

(22) PCT Filed: Feb. 7, 2000

(86) PCT No.: PCT/FR00/00283

§ 371 (c)(1),
(2), (4) Date: Jan. 14, 2002

(87) PCT Pub. No.: WO00/54454

PCT Pub. Date: Sep. 14, 2000

(30) Foreign Application Priority Data

Mar. 8, 1999 (FR) .............................. 99 02834

(51) Int. Cl.$^7$ .............................................. G06K 19/00
(52) U.S. Cl. ...................... 235/487; 235/492; 235/494
(58) Field of Search ................................. 235/487, 492, 235/494; 380/28, 30, 46

(56) References Cited

U.S. PATENT DOCUMENTS 6,069,954 A * 5/2000 Moreau ........................ 380/28
6,304,658 B1 * 10/2001 Kocher et al. ................ 380/30
6,446,052 B1 * 9/2002 Juels ............................ 705/69

OTHER PUBLICATIONS

Nakao, Yasushi et al, "*The Security of an RDES Cryptosystem against Cryptanalysis*", IEICE Transactions on Fundamentals of Electronics, Communications and Computer Sciences, JP, Institute of Electronics Information and Comm. Eng. Tokyo, vol. E79A, No. 1, pps. 12–19.

* cited by examiner

*Primary Examiner*—Karl D. Frech
(74) *Attorney, Agent, or Firm*—Burns, Doane, Swecker & Mathis, L.L.P.

(57) ABSTRACT

An electronic component uses a secret key cryptographic algorithm that employs several successive computing cycles to supply final output data from initial input data applied at the first cycle. A first random value is applied to a computation conducted for each cycle, to obtain unpredictable output data. A second random value as also applied to the initial input data that is used for the input of the first cycle.

8 Claims, 8 Drawing Sheets

| TC₀ 1 →  E=b1b2b3b4b5b6 | S=a1a2a3a4 |
|---|---|
| 000000 | 1101 |
| 000001 | 0101 |
| . | . |
| . | . |
| . | . |
| 111111 | 1010 |

| $TC_0 1$ | $E = b1 b2 b3 b4 b5 b6$ | $S = a1 a2 a3 a4$ |
|---|---|---|
| | 000000 | 1101 |
| | 000001 | 0101 |
| | ⋮ | ⋮ |
| | 111111 | 1010 |

COUNTERMEASURE METHOD IN AN ELECTRIC COMPONENT USING A SECRET KEY CRYPTOGRAPHIC ALGORITHM

This disclosure is based upon, and claims priority from French Application No. 99/02834, filed on Mar. 8, 1999 and International Application No. PCT/FR00/00283, filed Feb. 7, 2000, which was published on Sep. 14, 2000 in a language other than English, the contents of which are incorporated herein by reference.

BACKGROUND OF THE INVENTION

The present invention relates to a countermeasure method in an electronic component implementing a secret key cryptographic algorithm. They are used in applications where the access to services or data is strictly controlled. They have an architecture formed around a microprocessor and memories, one of which is a program memory which contains the secret key.

These components are notably used in smart cards, for certain applications thereof. These are for example applications for accessing certain data banks, banking applications, or remote payment applications, for example for television, petrol dispensing or passing through motorway tolls.

These components or these cards therefore implement a secret key cryptographic algorithm, the best known of which is the DES (Data Encryption Standard) algorithm. Other secret key algorithms exist, such as the RC5 algorithm or the COMP128 algorithm. This list is of course not exhaustive.

Briefly and in general terms, the function of these algorithms is to calculate an encrypted message from a message applied at the input (to the card) by a host system (server, cash dispenser, etc.) and the secret key contained in the card, and to supply in return to the host system this encrypted message, which allows for example the host system to authenticate the component or the card, to exchange data, etc.

However, it has turned out that these components or these cards are vulnerable to attacks consisting of a differential current consumption analysis and which allow ill-intentioned third parties to find the secret key. These attacks are referred to as DPA (Differential Power Analysis) attacks.

The principle of these DPA attacks is based on the fact that the current consumption of a microprocessor executing instructions varies according to the data manipulated.

Notably, an instruction of a microprocessor manipulating a data bit generates two different current profiles depending on whether this bit has the value "1" or "0". Typically, if the instruction is manipulating a "0", there is at that execution instant a first consumed current amplitude, and if the instruction is manipulating a "1", there is a second consumed current amplitude, different from the first.

The characteristics of cryptographic algorithms are known: the calculations performed and parameters used. The sole unknown is the secret key contained in program memory. This cannot be deduced from the sole knowledge of the message applied at the input and the encrypted message supplied in return.

However, in a cryptographic algorithm, certain calculated data depend solely on the message applied in clear at the input of the card and the secret key contained in the card. Other data calculated in the algorithm can also be recalculated solely from the encrypted message (generally supplied in clear at the output of the card to the host system) and the secret key contained in the card. More precisely, each bit of these particular data items can be determined from the input or output message, and from a limited number of particular bits of the key.

Thus, each bit of a particular data item has corresponding thereto a sub-key formed by a particular group of bits of the key.

The bits of these particular data items which can be predicted are referred to in the remainder of the document as target bits.

The basic idea of the DPA attack is thus to use the difference in the current consumption profile of an instruction depending on whether it is manipulating a "1" or a "0" and the possibility of calculating a target bit by the instructions of the algorithm from a known input or output message and a hypothesis on the corresponding sub-key.

The principle of the DPA attack is therefore to test a given sub-key hypothesis by applying, to a large number of current measurement curves, each relating to an input message known to the attacker, a Boolean selection function, a function of the sub-key hypothesis, and defined for each curve by the value predicted for a target bit.

Making a hypothesis on the sub-key concerned in fact gives the capability of predicting the value "0" or "1" which this target bit will take for a given input or output message.

There can then be applied, as a Boolean selection function, the value "0" or "1" predicted for the target bit for the considered sub-key hypothesis, in order to sort these curves into two bundles: a first bundle groups together the curves where the target bit was manipulated at "0" and a second bundle groups together the curves where the target bit was manipulated at "1" according to the sub-key hypothesis. By calculating the current consumption mean in each bundle, a mean consumption curve $M0(t)$ for the first bundle and a mean consumption curve $M1(t)$ for the second bundle are obtained.

If the sub-key hypothesis is correct, the first bundle actually groups together all the curves among the N curves where the target bit was manipulated at "0" and the second bundle actually groups together all the curves among the N curves where the target bit was manipulated at "1". The mean consumption curve $M0(t)$ of the first bundle will then have a mean consumption everywhere except at the moments at which the critical instructions are executed, with a current consumption profile characteristic of manipulation of the target bit at "0" ($profile_0$). In other words, for all these curves, all the manipulated bits had as many chances of having the value "0" as having the value "1", except the target bit which always had the value "0". This can be written:

$$M0(t)=[(profile_0+profile_1)/2]_{t \neq tci}+[profile_0]_{tci}$$

that is $$M0(t)=[Vm_t]_{t \neq tci}+[profile_0]_{tci}$$

where tci represents the critical instants, at which a critical instruction was executed.

Similarly, the mean consumption curve $M1(t)$ of the second bundle corresponds to a mean consumption everywhere except at the moments at which the critical instructions are executed, with a current consumption profile characteristic of manipulation of the target bit at "1" ($profile_1$). The following can be written:

$$M1(t)=[(profile_0+profile_1)/2]_{t \neq tci}+[profile_1]_{tci}$$

that is $$M1(t)=[Vm_t]_{t \neq tci}+[profile_1]_{tci}$$

Figure 1:
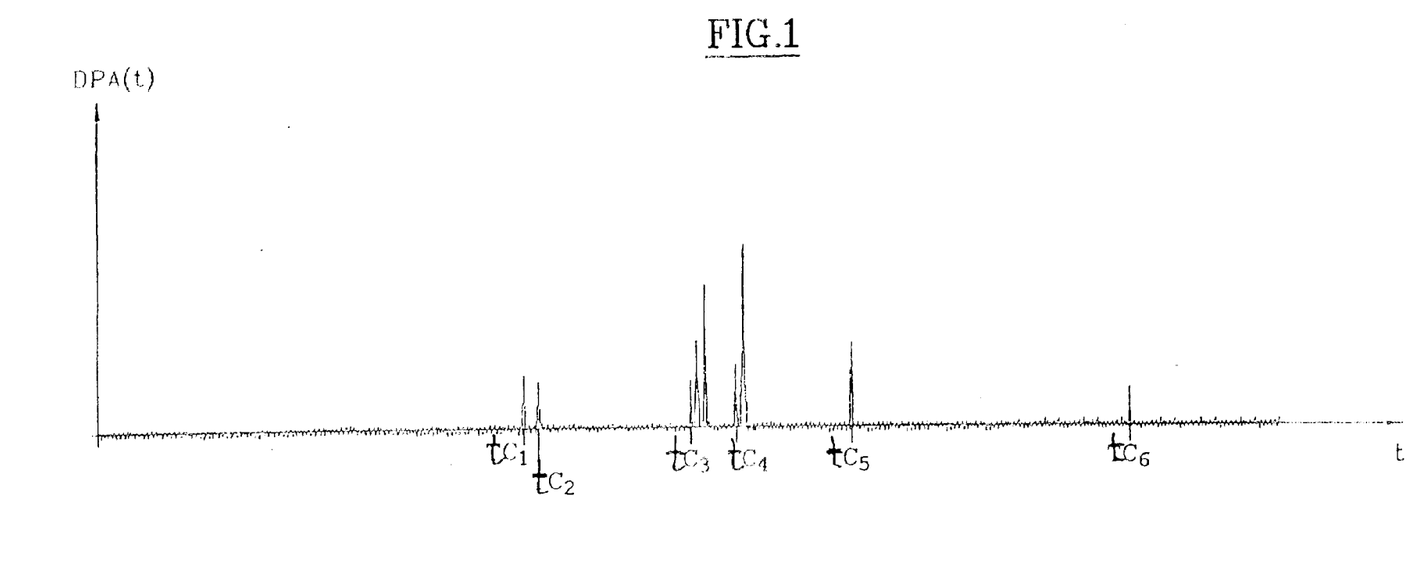
FIGS. 1 and 2, already described, depict the signal DPA(t) which can be obtained in accordance with a hypothesis on a sub-key of the secret key K, according to a DPA attack.

It has been seen that the two profiles $profile_0$ and $profile_1$ are not equal. The difference in the curves $M0(t)$ and $M1(t)$ then gives a signal DPA(t), the amplitude of which is equal to $profile_0-profile_1$ at the critical instants tci at which the critical instructions manipulating this bit are executed, that is to say, in the example depicted in FIG. 1, at the locations tc0 to tc6, and the amplitude of which is approximately equal to zero apart from the critical instants.

If the sub-key hypothesis is false, the sort does not correspond to reality. Statistically, there are then, in each bundle, as many curves where the target bit was actually manipulated at "0" as curves where the target bit was manipulated at "1". The resultant mean curve M0(t) is then situated around a mean value given by $(profile_0+profile_1)/2=Vm$, since, for each of the curves, all the bits manipulated, including the target bit, have as many chances of having the value "0" as having the value "1".

The same reasoning on the second bundle leads to a mean current consumption curve M1(t), the amplitude of which is situated around a mean value given by $(profile_0+profile_1)/2=Vm$.

Figure 2:
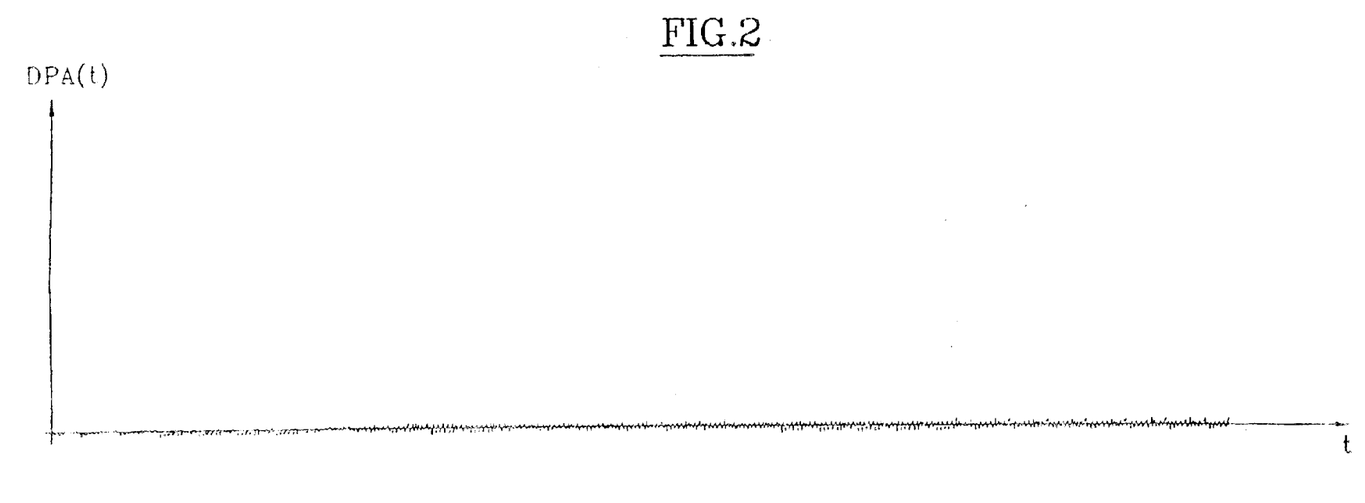

The signal DPA(t) supplied by the difference M0(t)−M1(t) is in this case substantially equal to zero. The signal DPA(t) in the case of a false sub-key hypothesis is depicted in FIG. 2.

Thus, the DPA attack exploits the difference in the current consumption profile during execution of an instruction according to the value of the manipulated bit, in order to carry out a current consumption curve sort according to a Boolean selection function for a given sub-key hypothesis. By carrying out a differential analysis of the mean current consumption between the two bundles of curves obtained, an information signal DPA(t) is obtained.

Overall, the steps in a DPA attack then consist in:

a—taking N random messages (for example N equal to 1000);

b—making the card execute the algorithm for each of the N random messages, plotting the current consumption curve each time (measured on the power supply terminal of the component);

c—making a hypothesis on a sub-key; FIG. 2). It is necessary to return to step c—and make a new hypothesis on the sub-key.

If the hypothesis proves to be correct, the procedure can move to the evaluation of other sub-keys, until the key has been reconstructed as much as possible. For example, with a DES algorithm, use is made of a key of 64 bits, only 56 of which are useful. With a DPA attack, it is possible to reconstruct at least 48 bits of the 56 useful bits.

Two documents relating to the technological background are cited below. These are the documents NAKAO Y ET AL: "THE SECURITY OF AN RDES CRYPTOSYSTEM AGAINST LINEAR CRYPTANALYSIS", IEICE TRANSACTIONS ON FUNDAMENTALS OF ELECTRONICS, COMMUNICATIONS AND COMPUTER SCIENCES, JP, INSTITUTE OF ELECTRONICS INFORMATION AND COMM. ENG. TOKYO, vol. E79-A, no. 1, page 12–19 XP000558714 ISSN: 0916-8508, denoted D1 and WO 00 27068, denoted D2.

The document D1 relates to a cryptosystem using the DES in order to be made secure.

The document D2 relates to an electronic component implementing a secret key algorithm; the implementation of this algorithm comprises the use of first means from an input data item (E) in order to supply an output data item.

The aim of the present invention is to implement, in an electronic component, a countermeasure method against attacks by differential analysis which brings about a null signal DPA(t), even where the sub-key hypothesis is correct.

In this way, nothing allows the correct sub-key hypothesis case to be distinguished from the false sub-key hypothesis cases. By means of this countermeasure, the electronic component is guarded against DPA attacks.

It is known through the French patent application FR 2 785 477 published on 5 May 2000, by the GEMPLUS company, the content of which in its entirety forms an integral part of the present application, that it is not sufficient to arrange that the signal DPA(t) is null in relation to a given target bit.

SUMMARY OF THE INVENTION

This is because, if the value taken by a number of target bits of the same data item manipulated by the critical instructions is considered, the curves will have to be sorted, no longer into two bundles, but into a number of bundles. It is no longer a binary selection function. It can be shown that, by next grouping together these bundles in one way or another, a signal DPA(t) can be obtained which is non-null in the case of a correct sub-key hypothesis, whereas it would have been null if a sort had been performed according to a binary selection function on a single target bit.

Let, for example, two target bits of the same data item be taken. These two target bits can take the following $2^2$ values: "00", "01", "10" and "11".

By applying the selection function to the N=1000 measured current consumption curves, four bundles of curves are obtained. If the sort is correct, a first bundle of around 250 curves corresponds to the value "00", a second bundle of around 250 curves corresponds to the value "01", a third bundle of around 250 curves corresponds to the value "10" and a fourth bundle of around 250 curves corresponds to the value "11".

If the first and fourth bundles are grouped together in a first group and the second and third bundles are grouped together in a second group, two groups which are not equivalent are obtained.

In the first group, the two bits have as many chances of having the value "00" as having the value "11". The mean value at the critical instants of all the consumption curves in this group can be written:

$$M1(t_{ci})=[\text{consumption}(\text{"00"})+\text{consumption}(\text{"11"})]/2$$

In the second group, the two bits have as many chances of having the value "01" as having the value "10". The mean value at the critical instants of all the consumption curves in this group can be written:

$$M2(t_{ci})=[\text{consumption}(\text{"01"})+\text{consumption}(\text{"10"})]/2$$

If the difference between these two means is calculated, a non-null signal DPA(t) is obtained. In other words, the two groups whose mean consumptions are being compared do not have an equivalent content.

In the aforementioned French patent application, an attempt has been made to prevent any significant signal in the DPA attack sense being obtained. Whatever the number of target bits taken, whatever the combination of bundles made for comparing the mean consumptions, the signal DPA(t) will always be null. For this, it is necessary to obtain equivalent bundles, whatever the number of target bits considered.

The aforementioned French patent application, as a solution to these various technical problems, proposes the use of a random value in an EXCLUSIVE OR operation with at least some output data from calculation means used in the algorithm.

With the use of such a random value, the data manipulated by the critical instructions become unpredictable while having a correct result at the output of the algorithm.

In the invention, however, it was ascertained that attacks could still be carried out successfully at well-determined locations in the algorithm execution, notably at the input and output of the algorithm.

The object of the present invention is a countermeasure method in which these attacks are also made impossible. According to the invention, a second random value is used, applied to the input parameters of the cryptographic algorithm, in an EXCLUSIVE OR operation. This second random value propagates through the whole algorithm, so that the data which were not protected by the first random value are protected by the second.

Thus, according to the invention, depending on the location in the algorithm, the data are protected either by the first random value, or by the second, or by a combination of these two random values.

As characterised, the invention therefore relates to a countermeasure method in an electronic component implementing a secret key cryptographic algorithm, the implementation of which comprises a number of successive calculation cycles in order to supply, from first input data applied to the first cycle, final data at the output of the last cycle allowing the production of an encrypted message, each calculation cycle using calculation means for supplying an output data item from an input data item, said calculation means comprising the application of a first random value (u) in order to obtain at the output an unpredictable data item, characterised in that the method comprises the use of means of applying a second random value to said first input data, according to an EXCLUSIVE OR operation.

BRIEF DESCRIPTION OF THE DRAWINGS

Other characteristics and advantages of the invention are detailed in the following description given as a guide and being in no way limitative and with reference to the accompanying drawings, in which.

DETAILED DESCRIPTION

For a good understanding of the invention, the normal DES secret key cryptographic algorithm, with no countermeasure method, will first be described. This DES algorithm has 16 calculation cycles, denoted T1 to T16, as depicted in FIGS. 3 and 4.

Figure 3:
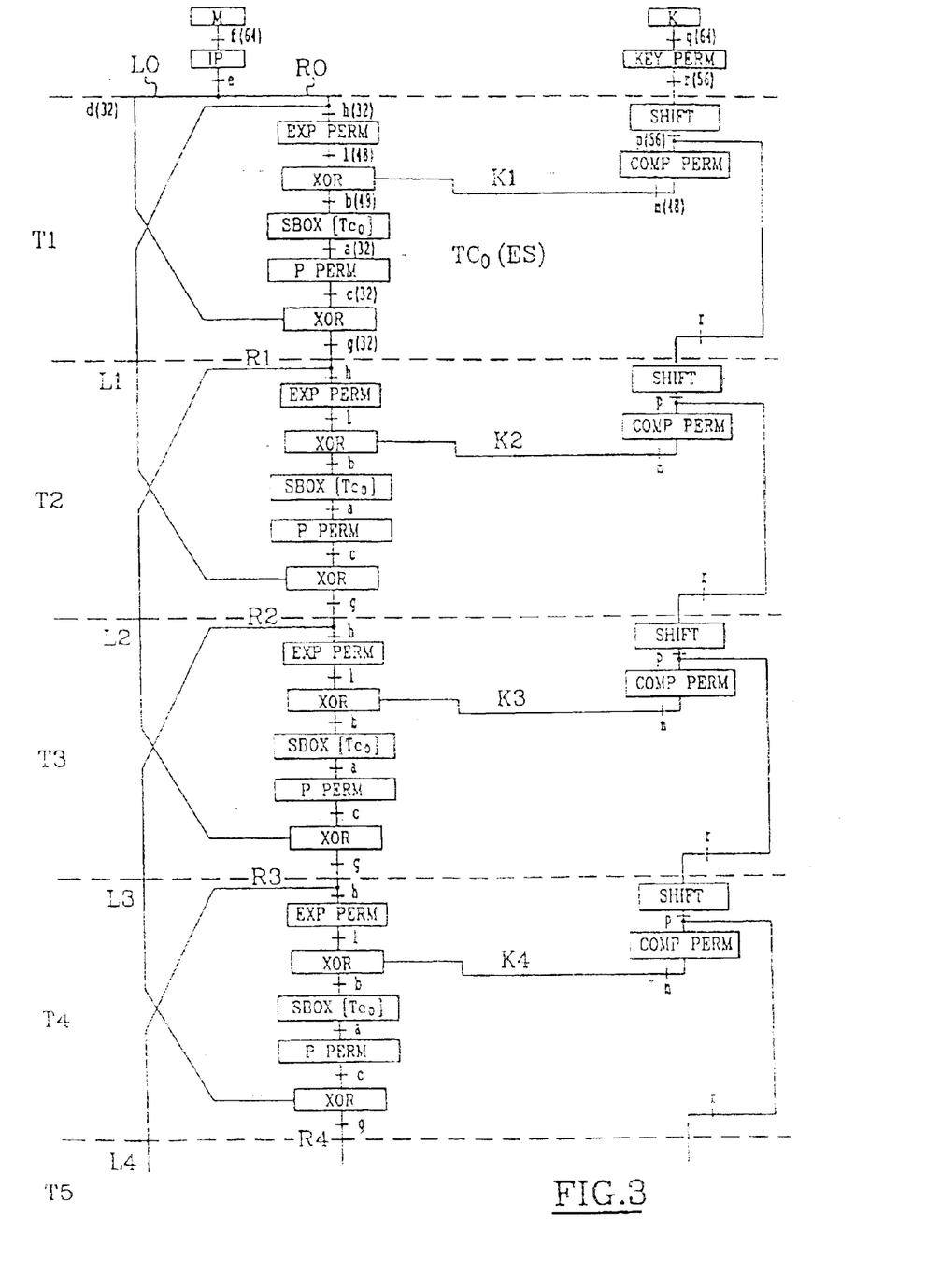
FIGS. 3 and 4 are detailed flow diagrams of the first and last cycles of the DES algorithm, according to the state of the art.
Figure 4:
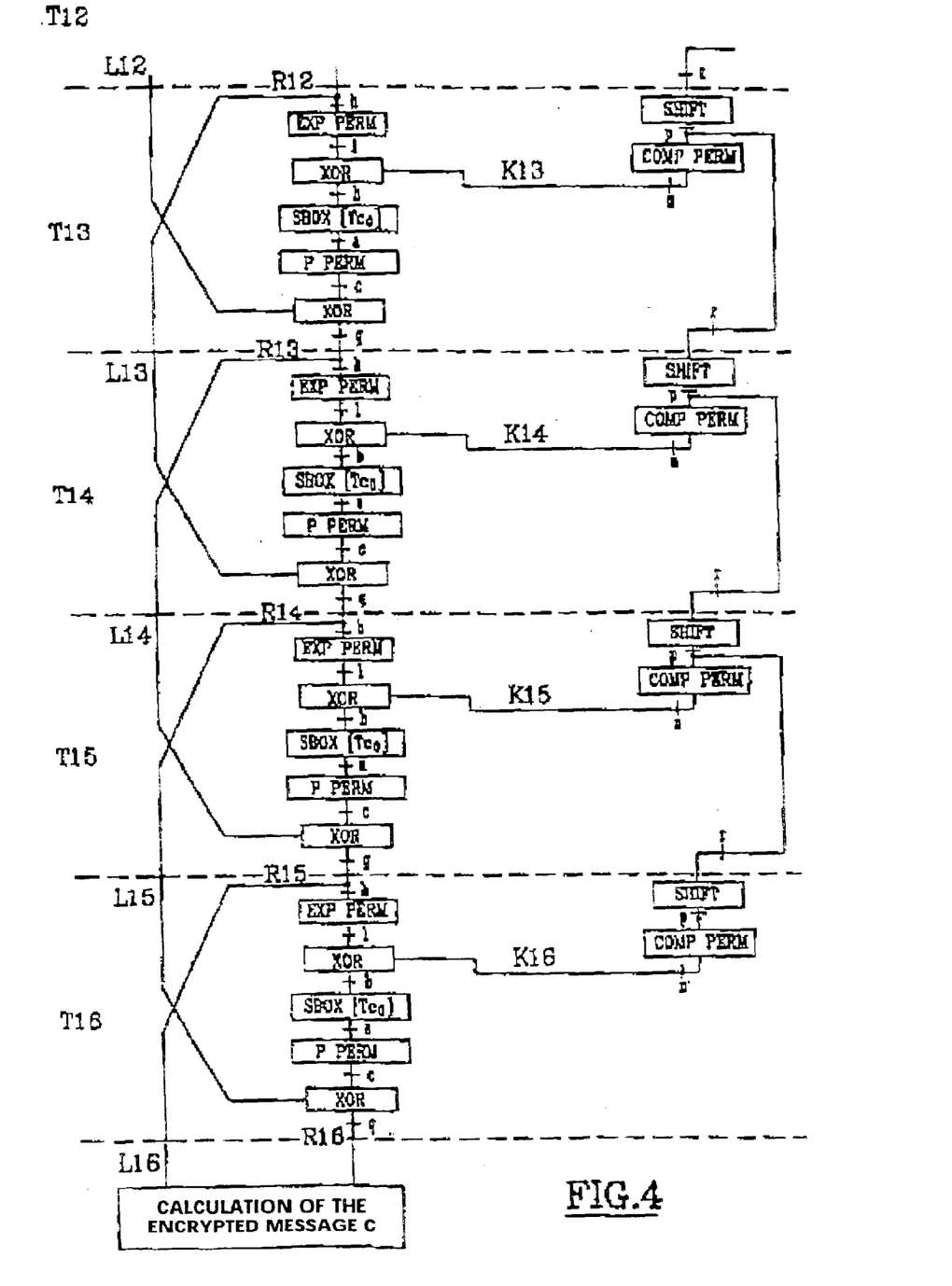

The DES starts with an initial permutation IP on the input message M (FIG. 3). The input message M is a 64-bit word f. After permutation, a 64-bit word e is obtained, which is cut into two in order to form the input parameters L0 and R0 of the first cycle (T1). L0 is a 32-bit word d containing the most significant 32 bits of the word e. R0 is a 32-bit word h containing the least significant 32 bits of the word e.

The secret key K, which is a 64-bit word q, itself undergoes a permutation and a compression in order to supply a 56-bit word r.

The first cycle comprises an operation EXP PERM on the parameter R0, consisting of an expansion and a permutation, in order to supply at the output a 48-bit word l.

This word l is combined with a parameter K1, in an EXCLUSIVE OR type operation denoted XOR, in order to supply a 48-bit word b. The parameter K1, which is a 48-bit word m, is obtained from the word r by a shift of one position (the operation denoted SHIFT in FIGS. 3 and 4) followed by a permutation and a compression (the operation denoted COMP PERM).

The word b is applied to an operation denoted SBOX, at the output of which a 32-bit word a is obtained. This particular operation will be explained in more detail in connection with FIGS. 5 and 6.

The word a undergoes a permutation P PERM, giving at the output the 32-bit word c.

This word c is combined with the input parameter L0 of the first cycle T1, in an EXCLUSIVE OR type logical operation, denoted XOR, which supplies at the output the 32-bit word g.

The word h (=R0) of the first cycle supplies the input parameter L1 of the next cycle (T2) and the word g of the first cycle supplies the input parameter R1 of the next cycle. The word p of the first cycle supplies the input r of the next cycle.

The other cycles T2 to T16 progress in a similar manner, except as regards the shift operation SHIFT which is carried out over one or two positions depending on the cycles considered.

Each cycle Ti thus receives at the input the parameters Li−1, Ri−1 and r and supplies at the output the parameters Li and Ri and r for the next cycle Ti+1.

At the end of the DES algorithm (FIG. 4), the encrypted message is calculated from the parameters L16 and R16 supplied by the last cycle T16.

This calculation of the encrypted message C in practice comprises the following operations:

formation of a 64-bit word e' by reversing the position of the words L16 and R16, and then concatenating them;

application of the permutation $IP^{-1}$, the inverse of that of the DES start, in order to obtain the 64-bit word f' forming the encrypted message C.

Figure 5:
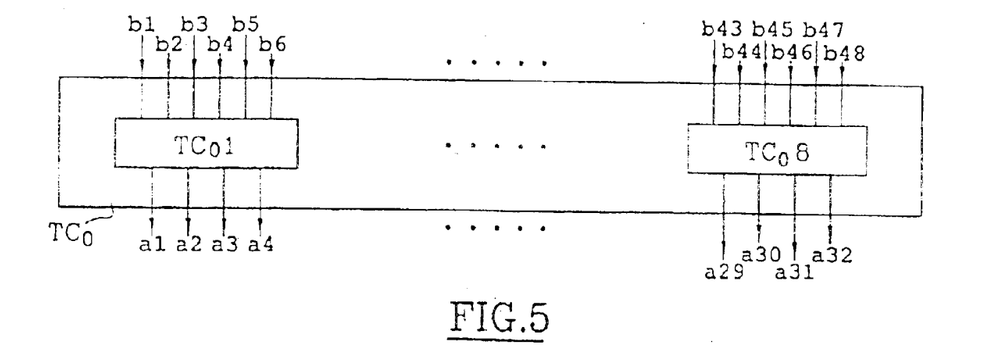
FIG. 5 is a block diagram of the operation SBOX used in the DES algorithm as presented in FIGS. 3 and 4.
Figure 6:
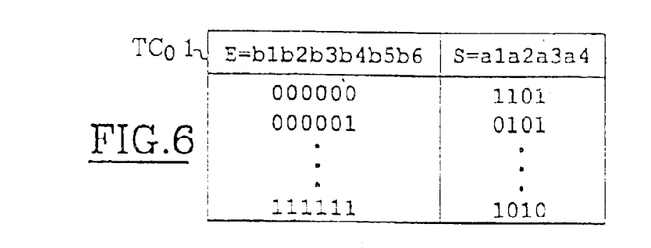
FIG. 6 shows an example elementary constants table with one input and one output used in the operation SBOX depicted in FIG. 5.

The operation SBOX is detailed in FIGS. 5 and 6. It comprises a constants table $TC_0$ for supplying an output data item a as a function of an input data item b.

In practice, this constants table $TC_0$ comes in the form of eight elementary constants tables $TC_01$ to $TC_08$, each receiving at the input only 6 bits of the word b, for supplying at the output only 4 bits of the word a.

Thus, the elementary constants table $TC_01$ depicted in FIG. 6 receives, as input data, the bits b1 to b6 of the word b and supplies, as output data, the bits a1 to a4 of the word a.

In practice these eight elementary constants tables $TC_01$ to $TC_08$ are stored in the program memory of the electronic component.

In the operation SBOX of the first cycle T1, a particular bit of the output data a of the constants table $TC_0$ depends on solely 6 bits of the data b applied at the input, that is to say on solely 6 bits of the secret key K and the input message (M).

In the operation SBOX of the last cycle T16, a particular bit of the output data a of the constants table $TC_0$ can be recalculated from solely 6 bits of the secret key K and the encrypted message (C).

However, going back to the principle of the DPA attack, if one or more bits of the output data a are chosen as target bits, it is sufficient to make a hypothesis on 6 bits of the key K in order to predict the value of the target bit or bits for a given input message (M) or output message (C). In other words, for the DES, it is sufficient to make a hypothesis on a 6-bit sub-key.

In a DPA attack on such an algorithm for a given set of target bits issuing from a given elementary constants table, a correct sub-key hypothesis has therefore to be distinguished from among 64 possible ones.

Thus, from the output bits of the eight elementary constants tables $TC_01$ to $TC_08$, up to 8×6=48 bits of the secret key can be discovered, by carrying out DPA attacks on corresponding target bits.

In the DES, critical instructions in the DPA attack sense are therefore found at the start of the algorithm and at the end. These instructions are detailed in the French patent application FR 98 13605 to which reference can usefully be made.

And it emerges that all the data manipulated by critical instructions are an output data item or data derived from an output data item of a DES start and end SBOX operation.

The countermeasure method described in the aforementioned French patent application applied to this DES algorithm consists of making each of the data items manipulated by the critical instructions unpredictable. Thus, whatever the target bit or bits used, the signal DPA(t) will always be null. This countermeasure method is applied to the DES start critical instructions and to the DES end critical instructions.

By taking the SBOX operations as first calculation means for supplying an output data item S=a from an input data item E=b, the countermeasure method of the aforementioned French patent application applied to the DES algorithm consists of using other calculation means instead of the first, in order to make the output data item unpredictable, so that this output data item and/or derived data manipulated by the critical instructions are all unpredictable.

These other means can comprise various means. They are calculated from the first means by applying an EXCLUSIVE OR with a random value u (or a derived random value) to one and/or the other of the input and output data of the first means.

The use of this random value u is such that the result at the output of the algorithm, that is to say, the encrypted message C, remains correct.

Figure 7:
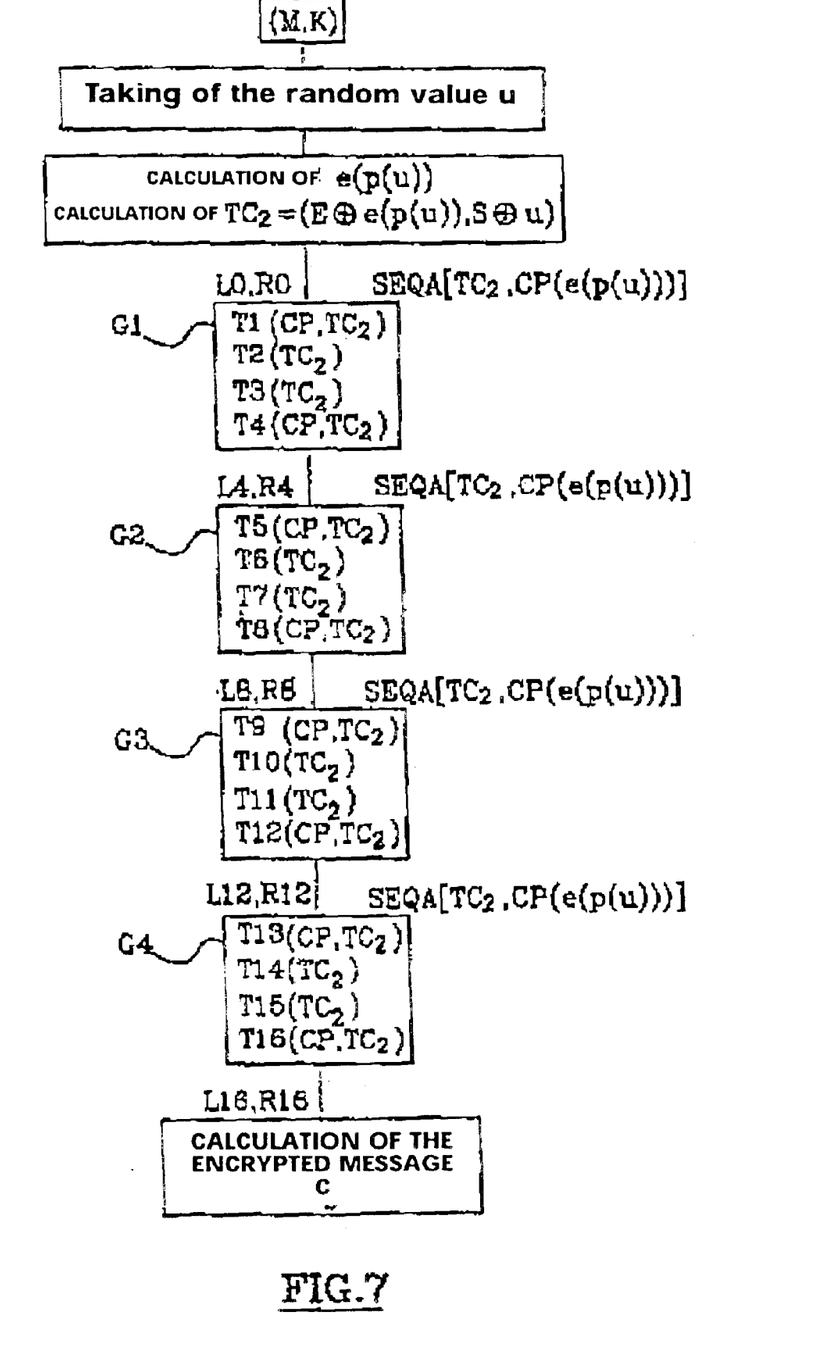
FIGS. 7 and 8 depict respectively an execution flow diagram of the DES and a detailed flow diagram of the first cycles, corresponding to an example application of the countermeasure method according to the state of the art.
Figure 8:
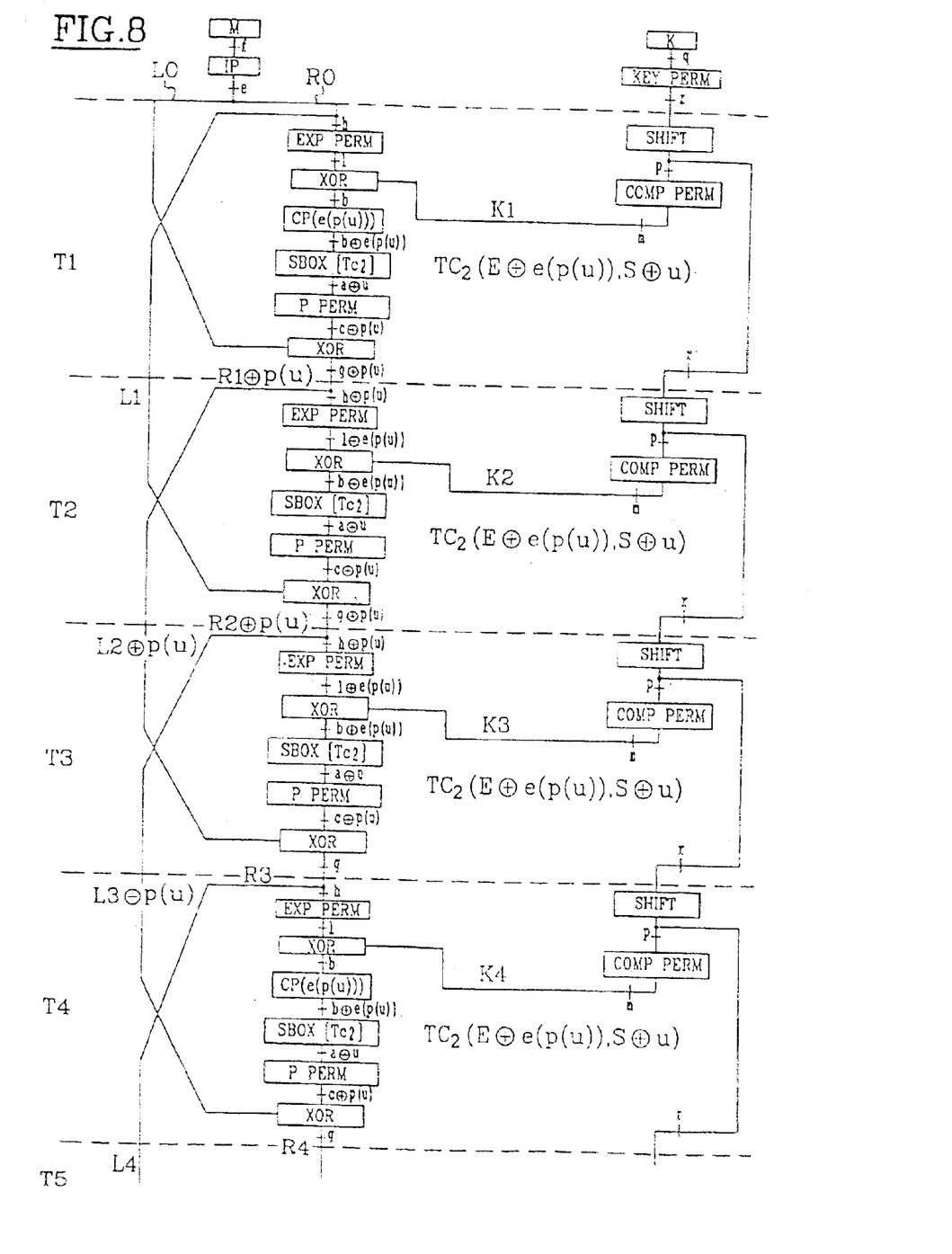

FIGS. 7 and 8 depict an example application of this countermeasure method, which corresponds to FIG. 10 of the aforementioned French patent application.

In a conventional execution of the DES algorithm, it has been seen that each cycle comprises the use of first means $TC_0$ in an operation SBOX.

In this example, and as depicted in FIG. 7, other means are calculated by performing an EXCLUSIVE OR with a random value u on the output data of the first means $TC_0$ and by performing an EXCLUSIVE OR with a derived value e(p(u)) on the input data of the first means $TC_0$. Then an identical execution sequence SEQA is applied to each group, which consists in using these other calculated means.

In this method, use is therefore made of a random value u which is a 32-bit data item. For example, a 32-bit random value can be taken, or else a 4-bit random value can be taken and copied 8 times in order to obtain a 32-bit random value.

The derived variable equal to e(p(u)) is then calculated, where p(u) corresponds to the result of the operation P PERM applied to the value u and where e(p(u)) is the result of the operation EXP PERM applied to the value p(u).

The other means used by this countermeasure method can then be calculated.

In the example depicted with reference to FIG. 7, these other means comprise second means $TC_2$ and an additional EXCLUSIVE OR operation denoted CP.

The second means $TC_2$ are used in each of the cycles.

They are calculated by applying an EXCLUSIVE OR with the derived random variable e(p(u)) to the input data E and applying an EXCLUSIVE OR with the random value u to the output data S of the first means $TC_0$, which can be written:

$$TC_2 = (E \oplus e(p(u)), S \oplus u).$$

The additional EXCLUSIVE OR operation CP with the derived random variable e(p(u)) makes it possible to obtain, at the input of the second means $TC_2$, the data $b \oplus e(p(u))$. This operation is denoted CP(e(p(u))) in FIGS. 7 and 8.

This additional EXCLUSIVE OR operation CP with the variable e(p(u)) can be placed in various locations in the first and last cycles, either between the operation EXP PERM and the operation XOR or between the operation XOR and the operation SBOX. It can be replaced by an additional EXCLUSIVE OR operation CP with the derived random variable p(u), by placing this additional operation CP(p(u)) before the operation EXP PERM. $1 \neq e(p(u))$ is obtained at the output, and this will therefore then give $b \oplus e(p(u))$.

In all these cases, the data $b \oplus e(p(u))$ is obtained at the input of the operation SBOX.

The calculation program then consists, at the start of execution of the algorithm, in taking a random value u, in the example a 4-bit value, of calculating the derived random variable e(p(u)), and then of calculating the various means used in the execution sequence SEQA, that is to say calculating the second means $TC_2$.

At the output of each group, the correct result for the output parameters is obtained. Thus, the output parameters L4 and R4 of the first group G1, L8 and R8 of the second group G2, L12 and R12 of the third group G3, and L16 and R16 of the fourth group G4 are correct whatever the random variable taken.

When all the cycles have been performed, the correct parameters L16 and R16 are obtained which will make it possible to calculate the correct encrypted message C.

On the other hand, within the groups, certain intermediate results do not have the same values according to the sequence used, but values corresponding to the EXCLUSIVE OR operation with the random value u or with the derived random value e(p(u)), which makes it possible to obtain protection against DPA attacks.

FIG. 8 shows the detailed flow diagram of the four cycles T1, T2, T3 and T4 of the first group G1, in the sequence SEQA, which makes it possible to reveal the role of the second means $TC_2$ used in each cycle. According to their definition: $TC_2 = E \oplus e(p(u))$, $S \oplus u$; by applying at the input the randomly modified data $b \oplus e(p(u))$ by means of the additional operation CP, the randomly modified data a⊕u is obtained at the output. Taking this reasoning from the cycle T1 to the end of the cycle T4, and noting that p(u)⊕p(u)=0, the unmodified data L4, R4 are obtained at the output of the cycle T4.

With such a countermeasure method, taking of the random value u and calculation of the means used in the execution sequence SEQA must be provided at the DES start. These means, calculated at each execution of the DES, are stored, at execution time, in working memory, the first means $TC_0$ which are used for the calculation being themselves stored in program memory.

This countermeasure method according to the state of the art, which therefore consists in general terms in applying a random value u at least to the output of the calculation means used in each cycle of the algorithm, leaves certain data in clear. In FIGS. 7 and 8 it can be seen that the input data, L0, R0, and following them the data h, l and b of the first cycle, are used in clear.

Similarly, the data R3, L4, R4, R7, LB, R8, R11, L12, R12, R15, L16 and R16 are used in clear.

In general terms, whatever the mode of application of the countermeasure method of the state of the art which has just been described, at least the input data L0 and R0 and output data L16 and R16 are used in clear in the algorithm. Other intermediate data may be so, as in the case described previously, which depend more particularly on the considered mode of application of the countermeasure method of the state of the art, of which FIGS. 7 and 8 show only one of the example applications.

In practice, attacks can therefore still be carried out on the algorithm, based on these data used in clear.

The present invention therefore proposes an improvement to the aforementioned countermeasure method, which makes it possible to make all the data used in the algorithm unpredictable, by means of either the first random value u, or a second random value denoted v, or a combination of the two.

Figure 9:
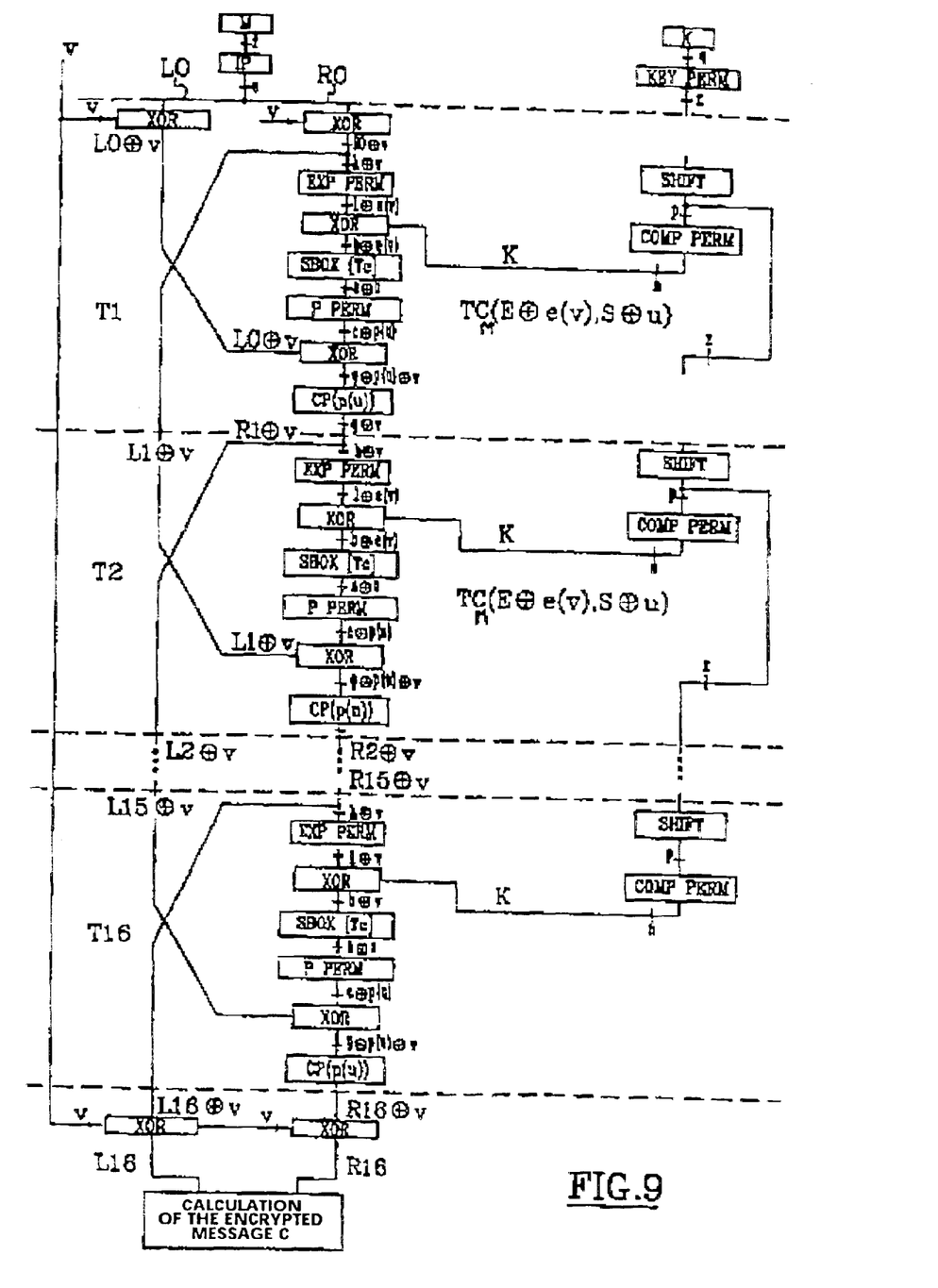
FIG. 9 depicts an execution flow diagram of the DES according to the invention.

An example implementation of this method is depicted in FIG. 9.

According to the invention, a second random value denoted v is used, applied to the input data L0 and R0, by means of an EXCLUSIVE OR operation.

Thus, the input data actually used in the calculation of the algorithm are unpredictable data equal to L0⊕v and R0⊕v.

This second random value propagates through each of the cycles of the algorithm. At the output of the sixteenth cycle T16, the unpredictable data equal to L16⊕v and R16⊕v are therefore obtained as output data.

In order to rediscover the true output data L16 and R16 which will make it possible to obtain the encrypted message C, an EXCLUSIVE OR operation with the second random value v is applied to each of these data items L16⊕v and R16⊕v.

The use of the two random values u and v in combination makes it possible to obtain an improved countermeasure method, making the DES algorithm which implements it impervious to attack.

FIG. 9 shows the detail of a practical example implementation of a countermeasure method according to the invention.

If the first cycle Ti is taken, there are at the input the data items L0⊕v and R0⊕v to which the operations EXP PERM and XOR (with the key K1) are applied successively. The data at the input of the next operation SBOX is therefore the data b⊕v.

The calculation means $TC_M$ associated with this operation SBOX consist, as in the countermeasure method of the state of the art, of a constants table deduced from the original constants table $TC_0$ of the DES algorithm.

Denoting this original constants table $TC_0$=(E, S) as seen in connection with FIG. 6, the new calculation means $TC_M$ are calculated as follows:

$$TC_M = (E \oplus e(v), S \oplus u).$$

In this way, the second random value v applied to the data at the input of each cycle is taken into account, and benefit is still obtained from the first random value, u, according to the method of the state of the art, at the output of the operation SBOX.

Thus, at the output of the operation SBOX using the calculation means $TC_M$, the data a⊕p(u) is obtained, to which the operation P PERM is applied, giving the data c⊕p(u).

The following XOR operation with the input data L0⊕v supplies at the output the data g⊕p(u)⊕v.

It should be noted that, in the state of the art described (FIG. 8), at this stage the data g⊕p(u) used at the input of the second cycle T2 was obtained.

With the method according to the invention, the other input of the second cycle is the data L1⊕v=R0⊕v, as shown in FIG. 9.

The second random value v therefore propagates through all the cycles of the algorithm.

If the random value u is not eliminated from the output data of the first cycle (R1⊕(v)⊕p(u)), it is necessary to make provision for the use of other calculation means $TC_{M'}$ in the second cycle T2, defined by $TC_{M'}=E \oplus e(v) \oplus e(p(u))$, S⊕u.

This implementation of the invention is not of great interest, since it necessitates the calculation of two new constants tables $TC_M$ and $TC_{M'}$, the random value u being applied in the table $TC_{M'}$, not only to the output, but also to the input.

Also, according to the invention, and as depicted in FIG. 9, in order to facilitate the use of the two random variables u and v by reducing the calculations necessary for its implementation and in order to repeat the same operations in each cycle, an additional EXCLUSIVE OR operation denoted CP(p(u)) is provided at the end of each cycle, so as to eliminate the value p(u) at the input of each new cycle. Thus, at the input of the second cycle T1, the data R1⊕v= (g⊕p(u)⊕v)⊕p(u) is obtained, that is $$R1 \oplus v = g \oplus v.$$

Each cycle then follows the previous one, executing the same sequence of calculation operations, so that, at the output of the sixteenth cycle, L16⊕v and R16⊕v are obtained as output data. By applying an EXCLUSIVE OR operation with the second random value v to each of these two data items, the data L16 and R16 are obtained which allow the encrypted message C to be produced.

By applying the countermeasure method according to the invention which combines the use of a first random value u in calculation means provided in each cycle and the use of a second random value applied at the input, before the execution of the first cycle, all the data used in the algorithm are made unpredictable. Depending on the location in the algorithm, the countermeasure protection according to the invention is provided either by the first random value u, or by the second random value v, or by a combination of these two values.

In practice, and in the example application depicted in FIG. 9, before executing the DES algorithm proper, it is necessary to execute the following operations:

taking of the random values u and v calculation of p(u) for the operation CP(p(u))

calculation of e(v)

calculation of $TC_M = E \oplus e(v), S \oplus u$.

The random value v is a data item having the same number of bits as the data items L0 and R0, that is 32 bits in the example. In this method, use is therefore made of a random value v which is a 32-bit data item. For example, a 32-bit random value can be taken, or else a 4-bit random value can be taken and copied 8 times in order to obtain a 32-bit random value (as for the random value u).

Other example applications can be envisaged, in which notably it can be provided that the cycles are not identical. All these variants which use the two random values according to the general principle explained are within the scope of the invention.

Figure 10:
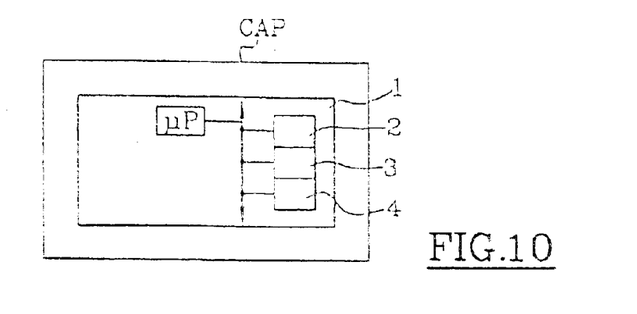
FIG. 10 depicts a simplified block diagram of a smart card having an electronic component in which the countermeasure method according to the invention is implemented.

An electronic component 1 implementing a countermeasure method according to the invention in a DES secret key cryptographic algorithm comprises typically, as depicted in FIG. 10, a microprocessor mP, a program memory 2 and a working memory 3. The various calculation means $TC_0$ and $TC_M$ are, in practice, constants tables stored respectively in program memory 1 and in working memory 3. In order to be able to manage the use of these calculation means, means 4 of generating a random value are provided which, if reference is made to the flow diagrams of FIGS. 7 and 11, will supply the random values u and v at each execution of the DES. Such a component can most particularly be used in a smart card 5, in order to improve its inviolability.

What is claimed is:

1. A countermeasure method against attacks by differential analysis in an electronic component implementing a secret key cryptographic algorithm, the implementation of which comprises a number of successive calculation cycles in order to supply, from first input data applied to the first cycle, final data at the output of the last cycle to produce an encrypted message, each calculation cycle using calculation means for supplying an output data item from an input data item, said calculation means performing the step of:

applying at least one random value to the input data item and to the output data item in order to obtain an unpredictable data item as an output, and wherein said countermeasure method includes the further step of:

applying a second random value to said first input data by means of an EXCLUSIVE OR operation.

2. A countermeasure method according to claim 1, further including the step of applying the second random value to the final data supplied by the last cycle by means of an EXCLUSIVE OR operation.

3. A countermeasure method according to claim 1 further including the step, at the end of each cycle, of executing an additional operation to eliminate said one random value at the output of each cycle.

4. A countermeasure method according to claim 1 wherein a new set of first and second random values is selected for each new execution of the algorithm.

5. A method according to claim 4, wherein said calculation means are derived from first calculation means, which defines corresponding output data for input data, said derivation being obtained by applying the second random value to said input data and applying the first random value at least to said output data of the first calculation means.

6. A countermeasure method according to claim 5, wherein the calculation means comprise constants tables.

7. An electronic security component that implements a countermeasure method for attacks against a secret key cryptographic algorithm by means of differential analysis, wherein said algorithm comprises a number of successive calculation cycles in order to supply, from first input data applied to the first cycle, final data at the output of the last cycle to produce an encrypted message, each calculation cycle using calculation means for supplying an output data item from an input data item, said component comprising first calculation means fixed in a program memory, second calculation means that are calculated at each new execution of the algorithm and stored in working memory by applying a first random value to the input data item and a second random value to the output data item, and means for generating said first and second random values for calculating said second calculation means.

8. A smart card comprising an electronic security component according to claim 7.

* * * * *

UNITED STATES PATENT AND TRADEMARK OFFICE
CERTIFICATE OF CORRECTION

PATENT NO. : 6,820,814 B1 Page 1 of 1
DATED : November 23, 2004
INVENTOR(S) : Olivier Benoit It is certified that error appears in the above-identified patent and that said Letters Patent is hereby corrected as shown below:

<u>Title page,</u>
Item [73], Assignee, replace "Gegemplus" with -- Gemplus --.

Signed and Sealed this

Fourth Day of October , 2005

JON W. DUDAS
*Director of the United States Patent and Trademark Office*